United States Patent
Hulyalkar et al.

(12)

(10) Patent No.: US 6,198,728 B1
(45) Date of Patent: Mar. 6, 2001

(54) MEDIUM ACCESS CONTROL (MAC) PROTOCOL FOR WIRELESS ATM

(75) Inventors: Samir N. Hulyalkar; Chiu Ngo, both of Ossining, NY (US); Yonggang Du, Aachen (DE)

(73) Assignee: Phillips Electronics North America Corp., New York, NY (US)

( * ) Notice: Subject to any disclaimer, the term of this patent is extended or adjusted under 35 U.S.C. 154(b) by 0 days.

(21) Appl. No.: 08/770,024

(22) Filed: Dec. 19, 1996

(51) Int. Cl.[7] ............................... H04J 3/16; H04L 12/56
(52) U.S. Cl. .................. 370/252; 370/280; 370/347; 370/349; 370/395
(58) Field of Search ..................... 370/252, 347, 370/311, 310, 913, 912, 468, 469, 253, 277, 280, 294, 329, 337, 349, 389, 395, 442; 455/38.2, 519, 68, 69, 70; 709/227, 228, 229, 231, 232, 238, 240

(56) References Cited

U.S. PATENT DOCUMENTS

| | | | |
|---|---|---|---|
| 5,012,469 | * | 4/1991 | Sardana ................................ 370/442 |
| 5,121,383 | * | 6/1992 | Golestani ............................. 370/412 |
| 5,276,703 | * | 1/1994 | Budin et al. ...................... 370/347 X |
| 5,371,734 | * | 12/1994 | Fischer ................................ 370/311 |
| 5,384,777 | * | 1/1995 | Ahmadi et al. .................. 370/347 X |
| 5,463,620 | * | 10/1995 | Sriram ................................. 370/395 |
| 5,471,461 | * | 11/1995 | Engdahl et al. ..................... 370/252 |
| 5,471,469 | * | 11/1995 | Flammer, III et al. .......... 370/347 X |
| 5,638,371 | * | 6/1997 | Raychaudhuri et al. ............. 370/347 |
| 5,677,909 | * | 10/1997 | Heide .................................. 370/347 |
| 5,684,791 | * | 11/1997 | Raychaudhuri et al. ............ 370/278 |
| 5,696,903 | * | 12/1997 | Mahany ........................... 395/200.58 |
| 5,926,482 | * | 7/1999 | Christie et al. ...................... 370/469 |

FOREIGN PATENT DOCUMENTS

| | | | |
|---|---|---|---|
| WO9417606 | 8/1994 | (WO) | ............................. H04B/7/216 |
| WO9631077 | 10/1996 | (WO) | ............................... H04Q/7/38 |

\* cited by examiner

*Primary Examiner*—Alpus H. Hsu
(74) *Attorney, Agent, or Firm*—Russell Gross

(57) ABSTRACT

A protocol, method, and apparatus for managing network communications which are particularly well suited for ATM communications across a wireless medium. Contiguous time slots within a frame are allocated to each node having traffic to send. Each node is assured a nominal bandwidth, and excess bandwidth is distributed by demand. The allocation of excess bandwidth can be dependent upon the size of the buffer at each node, as well as the time-criticality of each message. Nodes communicate their requests for allocation by appending such control information to the first of their transmitted packets. The allocation, of each node's transmit and receive time slots, is transmitted to all the nodes at the beginning of each frame. Thereafter, each node need not participate on the network until their allocated time periods, thereby allowing portable devices to enter inactive states to conserve power. The network is operated in a connection mode; connections are established in a relatively non-interfering manner by the use of periodically occurring beacons. Inactive, unconnected, nodes need only monitor the network during these beacon periods, further allowing for power conservation.

16 Claims, 8 Drawing Sheets

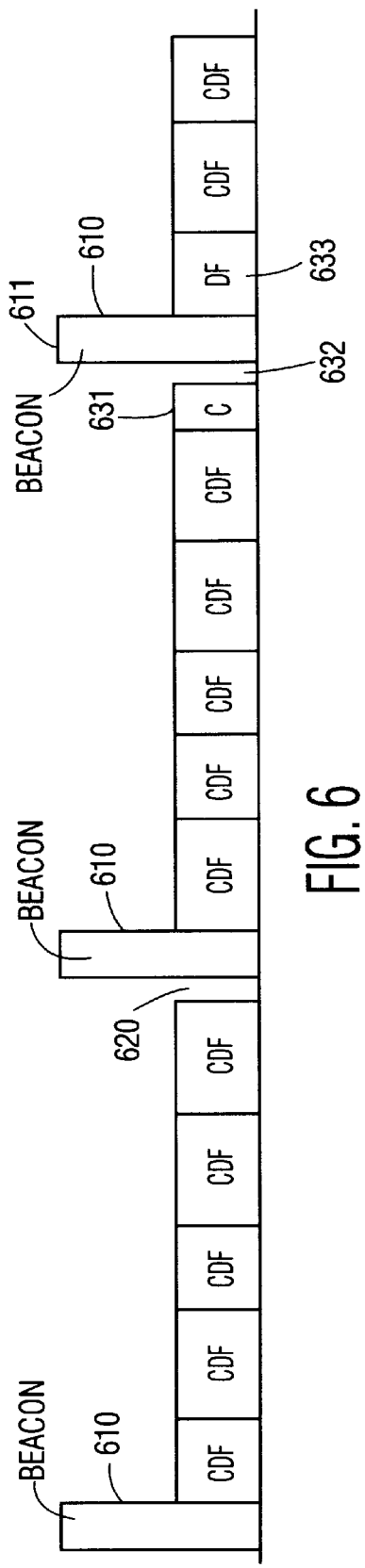

MEDIUM ACCESS CONTROL (MAC) PROTOCOL FOR WIRELESS ATM

BACKGROUND OF THE INVENTION

1. Field of the Invention

This invention generally relates to communication networks and protocols, with particular relevance to wireless networks, or other networks requiring minimal turnaround time. It specifically addresses a control protocol for wireless ATM, although the features presented can be applied to alternative protocols as well.

2. Discussion of the Related Art

Currently, communication networks are formed by interconnecting devices by wire or cable, and having each device conform to a protocol for sending messages along these wires and cables. In some instances, a portion of such a network may be implemented as a wireless connection, employing radio or infrared frequency signals between nodes. Such wireless connections are point-to-point, having a single communications device at each end, each tuned to each other at a frequency different from other devices in the same geographic area.

A wireless network, on the other hand, is formed without physical connections among the devices, employing, for example, radio frequency signals. Each device on the network is tuned to the same frequency, and each device conforms to a protocol for sending messages at this common frequency. The protocol may allow communication among all the devices in the network or the protocol may constrain each device to only communicate with a master device. Wireless networks offer a significant logistical advantage over wired networks, by obviating the need to run wires or cables to each device.

With increased availability of multimedia technologies, and the increased demand for information access, the market potential for residence or business based Local Area Networks (LANs) is growing. The ease of installation and expansion of a wireless network is certain to create a large demand for wireless LANs. For example, a central base station may provide wireless services, including voice, video, and data, to all the communications devices in one's home, or a wireless base station may provide for the communication among all the portable computers in an office, or all the computers on a campus. To be successful, however, the techniques and protocols employed in these wireless networks must not be significantly inferior to their wired network equivalents, and they must be able to provide compatibility with existing networks, particularly in terms of compatible service and management criteria.

During the past decades, protocols have been developed for effectively and efficiently managing the transfer of information within networks of communicating equipment. An underlying premise in the development of these network protocols has been that of a wired network infrastructure. In a wireless network, the assumptions upon which the wired network protocols were developed may no longer be valid. Although most of the existing protocols are functionally extensible to wireless networks, their effectiveness and efficiency may be adversely affected by the lack of a direct connection among devices.

Additionally, associated with a wireless network is the likelihood of the presence of portable, battery powered, devices. Although some wireless devices, such as desktop computers, televisions, and home theatre systems will be powered by AC line supplies, a number of wireless devices, such as telephones, cameras, and laptop computers will be powered by batteries. In providing for a wireless network protocol, consideration must be given to an architecture which allows for power conservation as well. Such considerations are rarely given to wired networks.

A common protocol employed for data communications in a wired network is Asynchronous Transfer Mode (ATM). ATM has been developed to deal with high speed data with different data rates, different quality of service (QoS) requirements (for example, data reliability, delay considerations, etc.), and different connection or connectionless paradigms for multimedia communications. ATM is well suited for multiplexing video, audio, and data in the same medium, by proper choice of the parameters required for each. Audio data, for example, does not require the packet-error reliability reburied of data services, but cannot tolerate excessive delay. Video data can in general suffer more delay than audio, but is intolerant to delay jitter. These delay and packet-error rate considerations are best supported by a connection oriented service, wherein the parameters are negotiated and established at the commencement of each connection. For optimum performance, ATM adopted an end-to-end error detection approach, premised on the assumption that the error rate associated with the communications medium, such as wired fiber-optics, was minimal. Only the terminal equipment monitors for errors; if an error is detected, a retransmission request is sent to the originating transmitter. ATM also blocks any services for which it cannot guarantee the required QoS. These characteristics, and other facets of ATM, are very effective for multimedia communication on a wired network, but are the very factors which are contrary to existing wireless network characteristics.

Existing efforts of building a wireless local area network (LAN) are focussed on emerging standards, such as IEEE 802.11 in the United States, and HIPERLAN in Europe. These standards do not take into consideration the ATM based quality of service (QoS) requirements for real time and data traffic, particularly in the area of delay. In a typical wireless network, delays will increase exponentially in an overloaded network, as each transmitter contends for access. Most wireless networks operate using some form of collision detection and receipt acknowledgement protocol. For example, each transmitter will listen for a quiet period, then transmit a packet. If another transmitter does not transmit at the same time, the receiver will receive the packet and acknowledge the receipt to the transmitter. If another transmitter transmits simultaneously, however, a collision occurs, the intended receiver(s) receive garbled messages, and no acknowledgement is sent. Upon the non-receipt of an acknowledgement, each transmitter will again attempt to transmit, hopefully not simultaneously. Wireless networks are characterized, in general, as having higher error rates, unpredictable delays, and requiring intermediate error detection and correction. Thus, typical wireless networks are inherently unsuitable for ATM traffic.

Clearly, an important issue in designing a wireless ATM is that the control protocol which specifies the method of access among multiple users to the same medium, the Medium Access Control (MAC) protocol, must satisfy the basic requirements of ATM, particularly in the area of delay considerations. One such protocol is the Dynamic Slot Assignment (DSA++) protocol designed for use within a European project, Mobile Broadband System (MBS). This protocol was premised, however, on the assumption that the uplink and downlink communication paths, to and from a base station, were each effected on different frequencies.

This reduced the turnaround time for control and acknowledgements, but required all stations to accommodate transmission and reception on two discrete and non interfering frequencies.

Thus, it is seen that the transformation of a wired network protocol, such as ATM, to a wireless network protocol typically requires additional time, or frequency, or both. It is the purpose of this invention to minimize the time required to communicate information within a network, without requiring additional frequency allocation, while supporting the QoS concepts of ATM. Although the invention presented is particularly applicable to wireless ATM networks, the principles embodied are equally applicable to minimize the time required to transfer information on other wired or wireless networks as well.

SUMMARY OF THE INVENTION

Essentially, the invention describes a method for controlling the access to the communications medium within a wireless network protocol, consistent with an underlying ATM network structure and protocol.

The access control in accordance with this invention comprises the following features:
- an optimized Control Data Frame (CDF) structure to minimize turnaround time;
- a Superslot data structure for Uplink signalling;
- a generalized Slot Allocation Policy at the MAC level which integrates the allocation uplink and downlink slots;
- a Buffer Overflow Control Policy at the MAC level; and,
- a Beacon-based implementation for MAC management services.

The optimized Control Data Frame (CDF) minimizes the turnaround time associated with transmissions in a wireless network by consolidating the control and downlink information, and optimizing the control and uplink information transmissions from each transmitter. In addition to minimizing the turnaround time, this structure also provides a deterministic nature to the communication patterns, allowing the terminal devices to perform other functions during inactive periods, or, in the case of battery powered devices, allowing them to conserve power during these inactive periods.

Associated with the Control Data Frame is the use of a Superslot architecture to allow the piggybacking of uplink control information onto a uplink data transmission to optimize the communications from each wireless device to a central, or base, system. This structure allows for minimal overhead, particularly the overhead required for synchronizing packets from each transmitter.

The generalized slot allocation policy supports the ATM QoS concept of a nominal bandwidth allocation for each device, and, in conjunction with the Buffer Overflow Control policy, allows for the reallocation of bandwidth for bursts of packets, consistent with the goals of ATM. Additionally, any remaining excess bandwidth is efficiently allocated among devices to optimize overall performance and QoS factors.

Consistent with the concepts of ATM QoS, each device on the wireless network negotiates a nominal level of service, with an understanding that, at times, the device will require more service, and at other times, less. The ATM server, in this negotiation, promises to provide the capability to support the nominal load as well as the bursts of heavier load. The Buffer Overflow Control, in accordance with this invention, performs two functions related to this basic ATM concept. It prioritizes transmissions to avoid buffer overflow during burst periods, and at the same time, as necessary, enforces the ATM QoS concepts by penalizing those devices which fail to conform to these concepts.

The Beacon based implementation for the management of the MAC services is optimized to reduce the synchronization time required among devices, as well as to allow inactive devices to regain access to the network as required. In accordance with this invention, a short beacon signalling period is interspersed at relatively long, but regular, intervals in the data flow. Within this beacon will be the timing and control signals to provide the higher level synchronization and management of the wireless network. By providing this higher level synchronization and control, the synchronization and control overhead within each packet can be minimized, thereby improving the overall efficiency of the network.

BRIEF DESCRIPTION OF THE DRAWINGS

FIG. 6 shows a Beacon Signalling method.

DETAILED DESCRIPTION OF THE PREFERRED EMBODIMENTS OF THE INVENTION

Figure 1:
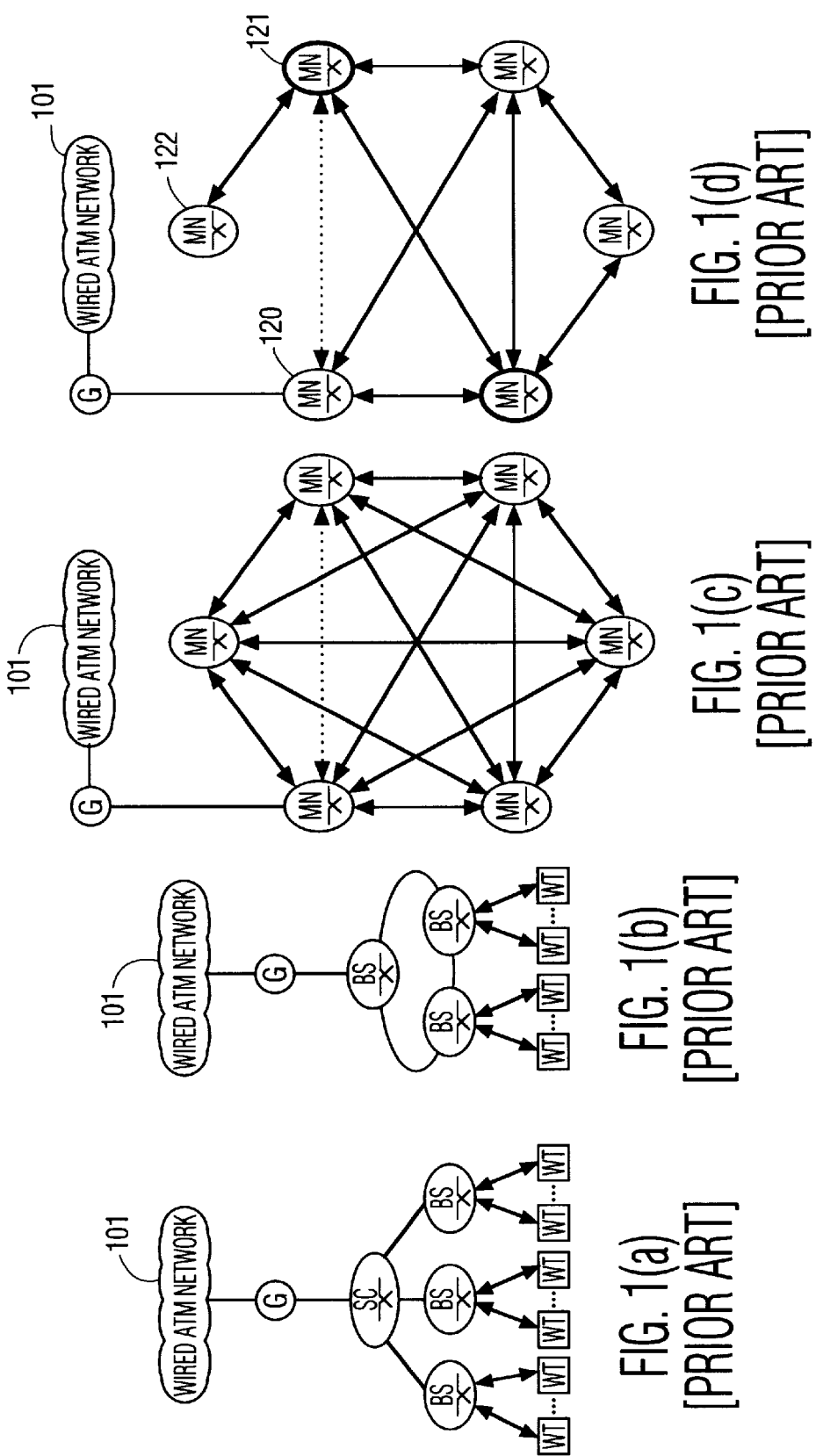
FIGS. 1a–1d show networks of wireless devices.

FIG. 1 shows a wireless network, comprised of wireless terminals, WT, base stations, BS, and hybrid stations called mobile nodes, MN. For completeness, also shown is the connection of the wireless network to a wired ATM network 101 through a gateway, G. FIGS. 1a and 1b show a wireless network with a centralized, or base station, architecture. FIGS. 1c and 1d show a wireless network with a distributed, or ad hoc, architecture. In FIG. 1a, the base stations BS are connected to a switching center SC in a tree topology. Packets from the Wired ATM Network 101 travel through the gateway G, and are directed to the appropriate base station BS by the switching center SC. The base station BS transmits and receives packets to and from the appropriate wireless terminal WT as will be discussed subsequently. In FIG. 1b, the base stations BS are connected in a ring topology. A packet is passed from base station to base station, until arrives at its destination base station. The destination base station removes the packet from the ring and transmits it to the appropriate wireless terminal. In FIG. 1c, each wireless device MN can operate as a base station as well, such that its transmission can be received by all other wireless devices on the network. In FIG. 1d is shown a forwarding node topology, wherein node 120 is unable to communicate directly with node 122, but node 121 is provided with the capability of forwarding packets from 120 to 122. Within each of these topologies, this invention will provide for effective and efficient communication. For ease of understanding, the base station topology of FIG. 1a will be assumed, but the implementation of the features of this invention to the other topologies would be evident to one skilled in the art.

Figure 2:
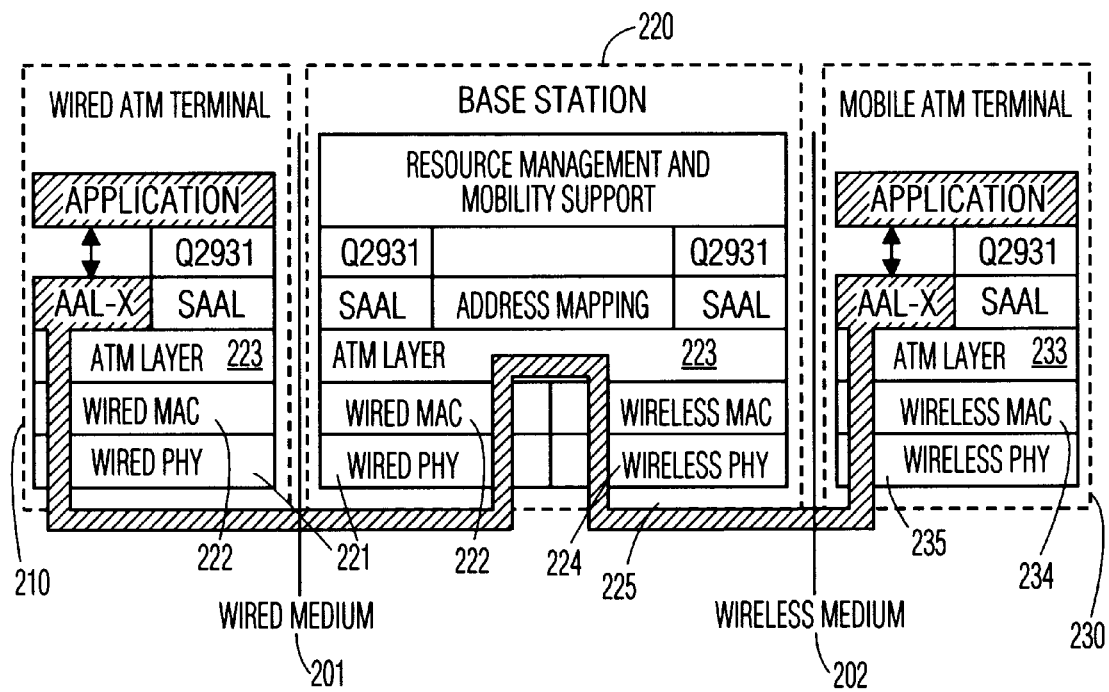
FIG. 2 shows a Layered Protocol model for ATM wired and wireless communication.

FIG. 2 shows the layered protocol model for the intergration of wired and wireless ATM via the Base Station. At one end of the communications path is a wired ATM device 210, such as cable TV transmitter. At the other end of the communications path is a wireless ATM device 230, such as a portable television. Interconnecting these devices is the wired medium 201, and the wireless medium 202; the transformation from wired to wireless media is accomplished at the base station 220. This base station 220 would be, for example, a transmitter which is centrally located in one's home, which is wired to the ATM provided services from, for example, a cable TV provider. The wire-specific attributes of the communications path are contained in the Wired PHY (Physical) layer 221 and the Wired MAC layer 222. These protocol layers transform the physical signals on the wire medium into ATM conforming data packets at the ATM level 223 which are independent of the physical media employed. The wireless-specific attributes of the communications path are contained in the Wireless MAC layer 224 and the Wireless PHY layer 225. These layers convert the ATM conforming packets into physical signals which can be transmitted over the wireless medium 202. Similar Wireless MAC 234 and Wireless PHY 235 layers are contained in the Wireless terminal 230 for converting these physical signals into ATM conforming data packets at 233. The capabilities of the wireless MAC 234 and PHY 235 layers in the wireless terminal 230 may be significantly less than those provided for in the base station 220, but the primary function they perform, of converting physical signals to and from ATM conforming signals, is identical.

Figure 3:
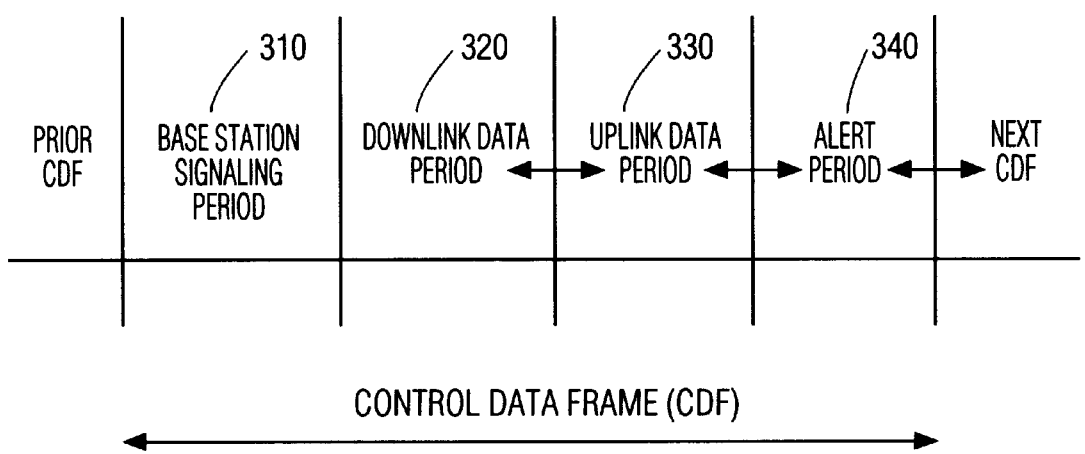
FIG. 3 shows the structure of the Control Data Frame.

The Control Data Frame (CDF) structure for communicating between the base station and the wireless terminals is shown in FIG. 3. The Control Data Frame, as its name implies contains both Control and Data. In accordance with this invention, the CDF is structured to minimize turnaround time, and to provide a deterministic timing for transmissions in this otherwise random process. Conventionally, in a wireless network, when an node has a packet, or set of packets, to transmit, it transmits each packet whenever a quiet period is detected. As noted previously, this results in unpredictable delays and delay jitter. In accordance with this invention, the base station will allocate the available data slots to the individual wireless terminals. It informs all the wireless terminals of this allocation in the Base Station Signalling period 310 of FIG. 3. The base station conveys this allocation by informing each wireless terminal when to start receiving packets, how many packets to receive, when to transmit packets, and how many packets to transmit. In so doing, each wireless terminal can subsequently allocate its non-communicating time to other tasks, or, in the case of battery powered equipment, can set a timer to interrupt at the appropriate time, and enter an inactive state in the interim. Although the CDF may be of variable length, each wireless terminal will also know when the next CDF will occur, by knowing when the last packet in the present CDF will be transmitted. Alternatively, to avoid continuous transmissions of very short CDFs, in the event of no packets to communicate, the signalling period 310 may contain an explicit notification of when the next CDF will occur. In this signalling period 310, the base station will also include operations and maintenance messages, as well as sequencing information for currently inactive wireless terminals, as will be discussed with reference to period 340.

Consistent with traditional wireless communication, each transmitter will be required to transmit a synchronization pattern to allow the intended receiver(s) to establish a common timing base. The base station will transmit its synchronization pattern at the start of signalling period 310. To avoid having to establish this synchronization with each wireless terminal's receiver independently, as packets are sent to each terminal, the base station will immediately follow the signalling period 310 with the transmission of all of its down-link packets during Downlink data period 320. Because all the wireless terminals will have synchronized to the base station to receive the signalling information, each wireless terminal which has been scheduled to receive packets from the base station need merely maintain this synchronization until its scheduled reception time. Note that, in this preferred embodiment, battery powered terminals might not be able to enter a totally inactive state, because in so doing they may lose synchronization. Thus, consistent with this invention, the order in which terminal packets are transmitted from the base station may be made to be dependent upon whether a particular terminal is power limited or not. In this way, packets to battery powered terminals will be transmitted from the base station first, thereby allowing these terminals to go to enter an inactive state sooner. Alternatively, resynchronization patterns could be transmitted with each set of packets to be sent to each transmitter.

The downlink data period 320 comprises the transmission of all scheduled data packets from the base station to the wireless terminals. In accordance with this invention, each wireless terminal will receive all of its scheduled data packets as one sequential set. In so doing, any required resynchronization can be accomplished within the first data packet, and all subsequent data packets can contain a full payload of data, thereby increasing the overall packet information transfer efficiency. And, as stated previously, this scheduled transmission of a set of sequential packets allows the wireless terminals to allocate their non communicating time efficiently.

The uplink data period 330 comprises the transmission of all scheduled data packets from the wireless terminals to the base station. As with the transmission from the base station, each terminal will transmit its allocated number of packets sequentially, beginning at its allocated time. Different from the base station's transmissions, however, in accordance with this invention, the first transmission slot of each terminal will be a SuperSlot, which allows for the transmission of a data packet as well as a control packet appended to this data packet. By allocating this longer initial time slot, rather than inserting the control information into a data packet, allows for greater efficiencies. If the control information were contained in a data packet, either an entire packet would need be allocated for control, or the original packets would need to be modified to contain this information. Because the first packet from each transmitter is easily identified, having been scheduled by the base station as previously discussed, it is a significantly simpler matter to extract the appended control information, rather than decoding one or more data packets to extract the embedded information. The control information which is transmitted from each wireless terminal comprises the information the base station requires to manage the network and allocate the bandwidth. It will contain the number of packets which the wireless terminal has remaining to transmit, and, in accordance with another aspect of this invention, their priority, as will be subsequently discussed. It may also contain operations and maintenance information as well, as would be typical of traditional network control protocols.

The Alert period 340 is utilized for currently inactive terminals to request active status. Depending upon the protocol established, this may take on a number of forms. If the need for immediate attention is not imperative, a polling technique may be employed. For example, in the signalling period 310, the host station could announce a terminal identifier, from among a list of currently inactive terminals.

Subsequent CDF periods 310 would contain other identified terminal from this list, in a round-robin fashion. If the identified terminal needs active status, it will transmit a signal in period 340. In the preferred embodiment, this signal would be minimal, to reduce the allocated time for such polling. If the signal is present, the base station will allocate one or more uplink slots to this terminal in the next CDF. The identified terminal would subsequently transmit any additional control information in its allocated superslot. Depending upon the performance factors desired, the protocol could be established such that upon receiving an alert signal, the identified terminal will receive its nominal bandwidth at the next CDF. Alternatively, the identified terminal may only receive one slot allocation, and the appropriate bandwidth would be assigned dependent upon the specified number of packets to be transmitted, as contained in the appended control information in the aforementioned superslot from this terminal. In the first scenario, excess bandwidth may be allocated, in the second, excess delay may be incurred. Also alternatively, a full superslot time could be allocated during the Alert period 340 to allow the transmission of a packet and the appropriate uplink control information.

In the alert polling scenario, a network which contains many inactive terminals may exhibit an excessive delay between the time a terminal has a packet to send and the time it is identified in the polling process. In accordance with this invention, the Alert period 340 may be structured differently to allow a more timely response, or a better utilization of bandwidth, as would be apparent to one skilled in the art. For example, if a particular terminal was particularly sensitive to such delays, the polling sequence might be modified to poll that terminal more frequently than others. Or, a non-polling approach may be employed. For example, a contention scheme could be utilized within this period. The base station will have identified when this alert period 340 will occur, during signalling period 310. Any terminal needing to signal an alert request would merely transmit an identifier during this period, and the base station would allocate one or more slots for this terminal in the next CDF, as detailed above. If a collision occurs, and the identifier is not received, the absence of an allocation in the next CDF will notify the requesting terminal that another alert request should be generated in the next alert period 340. Combinations of polling and contention based processes for requesting service may also be employed, as would be evident to one skilled in the art.

As discussed, each active wireless terminal will notify the base station of the number of packets remaining after the current CDF transmission to be transmitted to the base station. If this number is zero, the terminal identifier is placed on the inactive terminal list. If the number is not zero, the base station should allocate slots for this terminal in the next CDF. The base station must also allocate slots for packets received which need to be transmitted to the terminals, as well as slots for transmissions from all the other active terminals. Consistent with the above discussed premise of ATM, it is likely that at certain times of peak activity, there will be insufficient bandwidth, i.e. an insufficient number of slots within a CDF to accomodate the number of packets which need to be transmitted. Although the size of the CDF is variable, and as such could be stretched to accomodate the transmission of all the current packets, the size of the CDF should be constrained. The size of the CDF should be constrained so as to assure that terminals are serviced frequently enough to avoid excessive delay, particularly terminals which are conforming to the negotiated bandwidth allocation in return for an assurance of at least nominal service. In the preferred embodiment, the CDF period would be limited to not more than one millisecond; with present technology, this allows for about 50–100 ATM data packets to be transmitted within each CDF. These 50–100 data packets would be nominally allocated to the wireless terminals during the previously mentioned negotiation phase, as each connection is made within the network. If the negotiation is unsuccessful, for example if the base station does not have sufficient bandwidth currently available to satisfy the minimal functional requirement for the terminal, the connection is not made. For example, voice communication typically requires a minimum of 3 KHz bandwidth; if the base station doesn't currently have 3 KHz available, a busy signal might be returned. Such negotiation scenarios are well known to those versed in the art, and are not pertinent to this invention except in that, as previously stated, each connected terminal is guaranteed a QoS which is dependent upon an agreed upon nominal bandwidth. This nominal bandwidth is specified in terms of the number of packets which, on average, will be communicated to and from the terminal in each maximum CDF period. Thus, if the maximum CDF period is one millisecond, a bandwidth requirement of 15 kilopackets per second would equate to the allocation of a nominal 15 packets per CDF. Consistent with the ATM premise, however, the terminal which has been allocated this 15 kilo-packet per second bandwidth may, for short periods of time, require significantly more bandwidth, and thus more than its allocated 15 packets per CDF.

In accordance with this invention, the base station will allocate slots within each CDF to guarantee the nominal bandwidth and will reallocate unused slots to those terminals requiring additional slots in a prioritized manner. The prioritization, consistent with the premises of ATM, will endeavor to minimize the risk of data loss because of buffer overflow, particularly for well behaved terminals, and will endeavor to provide for an equitable assignment of any unused allocations. Because the CDF will contain both the uplink and downlink messages, the base station will manage the allocation of slots without direct regard for the flow direction. In so doing, unused downlink bandwidth may be allocated as required for uplink transmissions, and, correspondingly, unused uplink bandwidth may be allocated for downlink transmissions. In this and subsequent discussions, no distinction is made between the base station's downlink traffic and the wireless terminal's uplink traffic. The slot allocation is performed by treating the base station's downlink transmitter as merely another active terminal having traffic to send. For clarity, the term node will be used hereafter to encompass both the wireless terminals and the base station, with regard to uplink and downlink slot allocation.

Figure 4A:
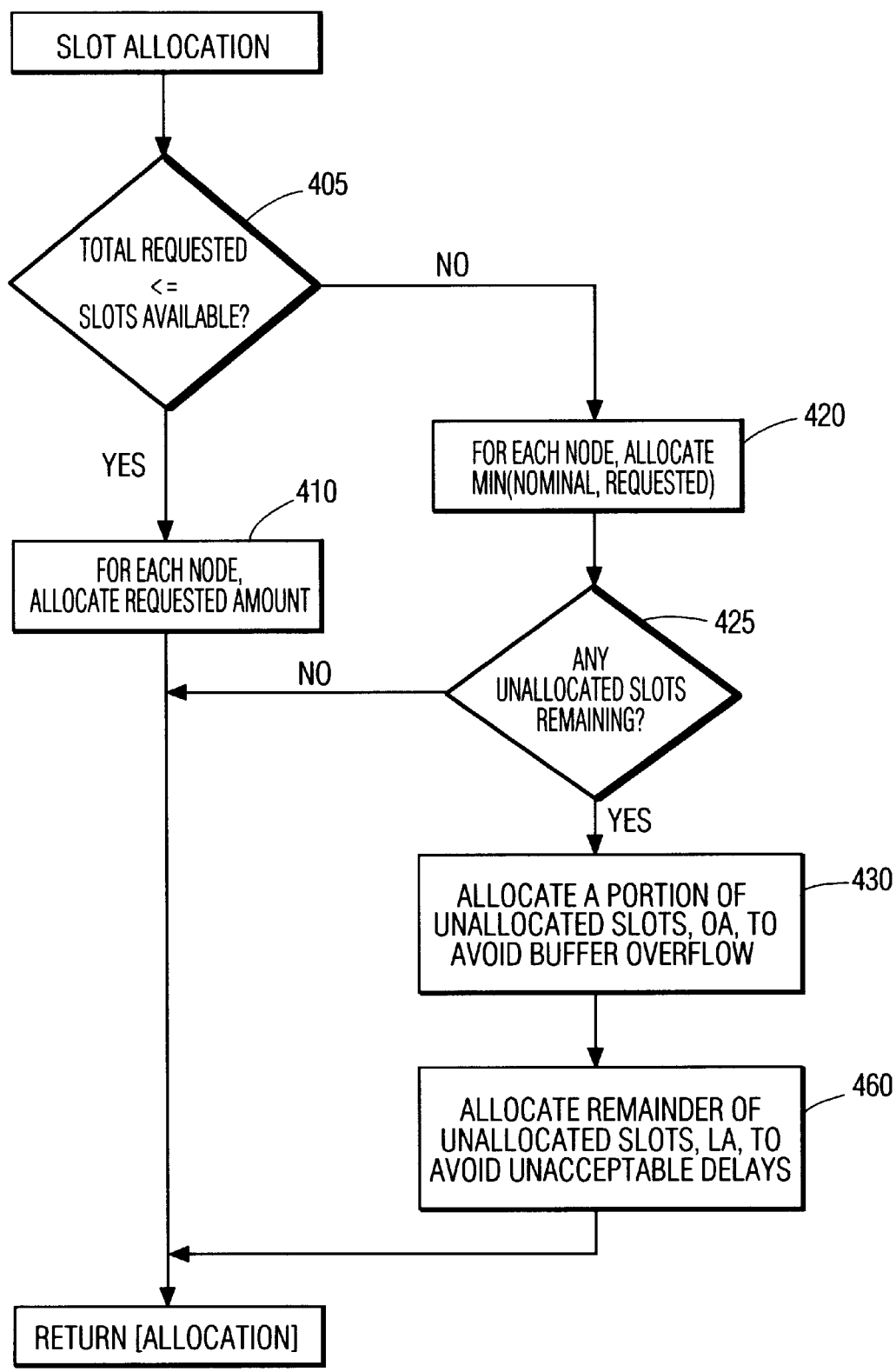
FIGS. 4a–4c show flowcharts for slot allocation.

FIG. 4 shows a flowchart for the slot allocation policy in accordance with this invention. As shown at 405, this allocation policy need only be invoked when the total packets requested to be communicated in this CDF is greater than the number of slots available in the CDF. If the number of packets to be communicated is less than the number of slots available, all packets will be scheduled to be communicated, at 410.

If more packets are desired to be communicated than slots are available within a CDF, a determination must be made as to which packets will be scheduled in this CDF, and which will be postponed to a subsequent CDF. This postponement can result in a loss of data, for example, if a node's buffer overflows, or in excessive delay. To minimize the mean delay through the network, and satisfy the QoS criteria, all nodes are given at least their nominal bandwidth allocation, if required, at 420. As stated above, the base station will only establish a connection to a terminal if it has the nominal number of slots available for that terminal in light of all the other established connections and their nominal allocations. Thus, the allocation in block 420 is guaranteed to result in each node receiving its nominal allocation, as required.

If, after allocating up to the nominal bandwidth to each active node, there are slots remaining, these slots should be allocated among the nodes with remaining data to be sent. If all nodes had infinite buffers, a laxity factor could be utilized to determine a fair distribution of the remaining slots to the nodes. Such a laxity factor, as will be subsequently discussed, orders packets by their relative need to be transmitted promptly. A high laxity factor indicates a relative insensitivity to delay; a low laxity factor indicates little tolerance for delays. Allocation in accordance with this laxity factor, low laxity packets allocated first, results in optimal throughput and overall fairness. But, as noted, such an allocation assumes no consequence other than delay in this allocation. In reality, loss of data may occur if the node has an insufficient buffer to accomodate the accumulation of data while waiting for its allocation. For example, a file transfer would be relatively insensitive to delay, but at each node which causes the delay, there must be sufficient memory to hold the packets which continue to arrive during this delay period. Thus, in practice, both delay and the risk of data loss must be considered in the allocation process.

In accordance with this invention, a portion of the remaining slots are allocated to minimize the risk of loss of packets due to buffer overflow, in block 430, and the remaining portion are allocated to maximize throughput while ensuring fairness in block 460. The size of the portion allocated to minimize the risk of data loss in 430 will be a function of the specific network architecture and composition. This proportion can be fixed, for example, half the allocation for buffer overflow protection, half for maximizing throughput. Or, it can initially fixed, then modified by the base station or some other controller in dependence upon an assessment of the likelihood of buffer overflows based on actual performance thus far.

Figure 4B:
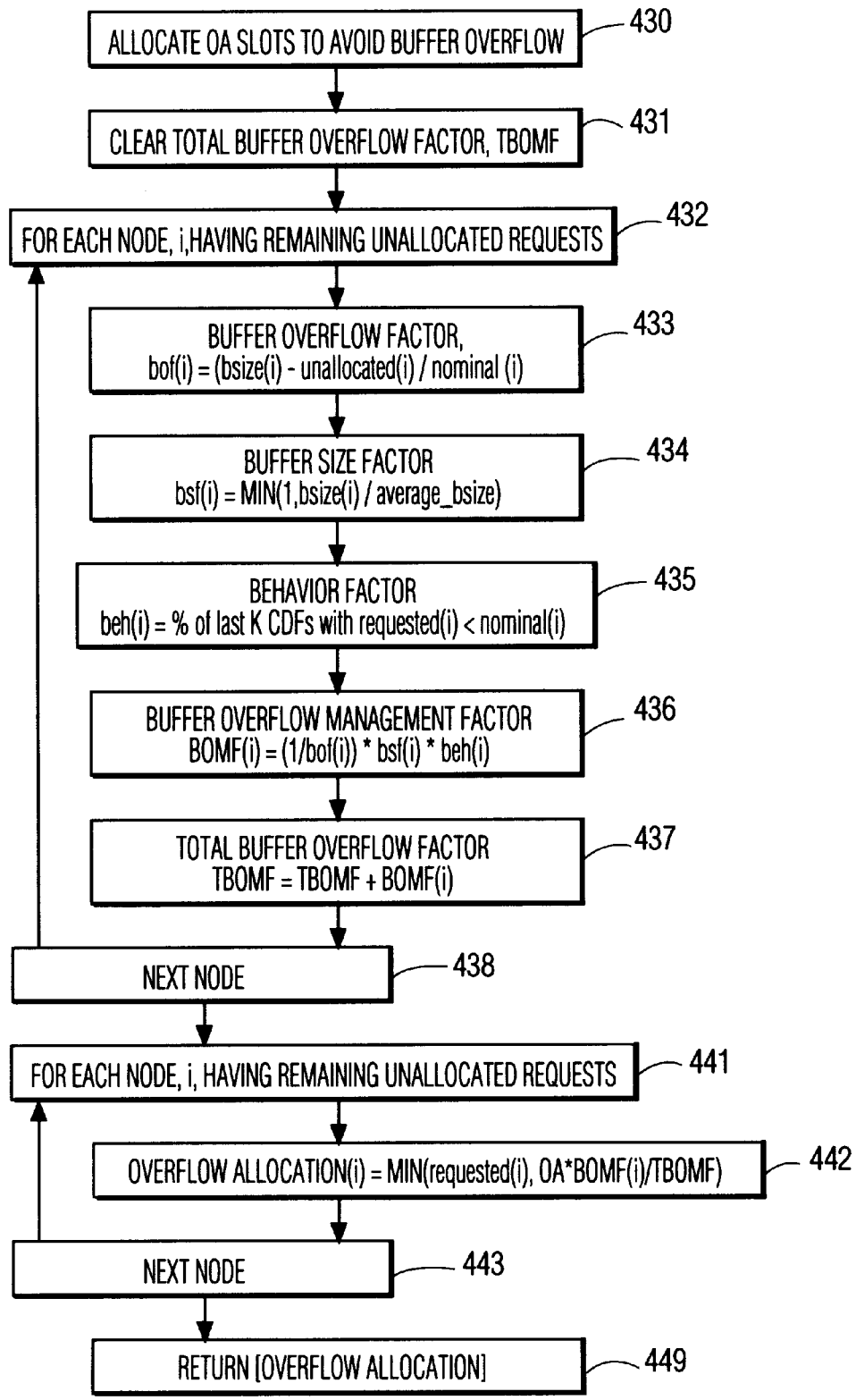
Figure 4C:
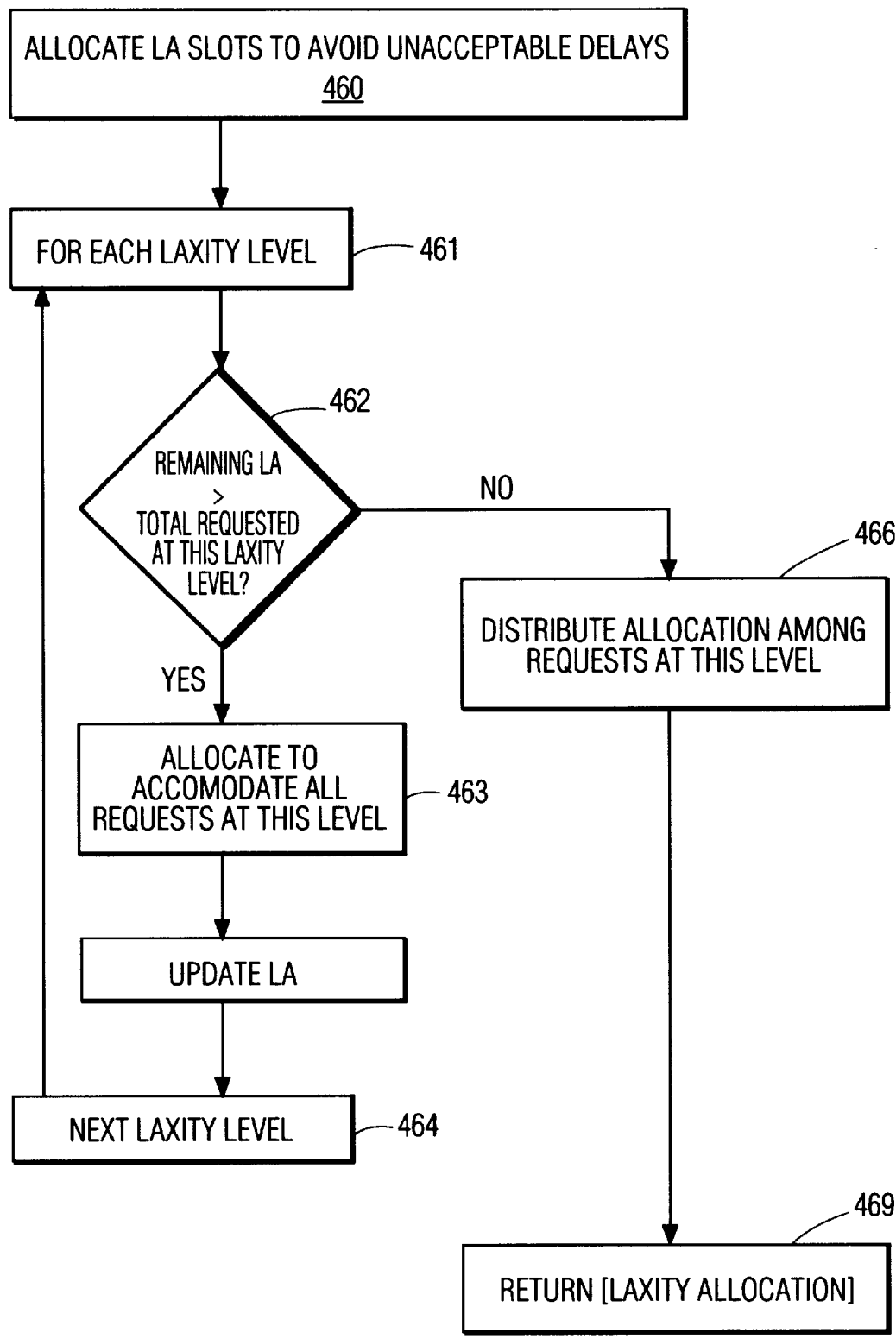

Block 430 is further detailed in FIG. 4*b*. For each node having a non-zero remainder of packets to transmit, a buffer overflow factor, bof(i), is calculated as the ratio of the amount of available buffer, to the nominal allocation, at 433. The available buffer is the size of the node's buffer minus the number of remaining packets to be transmitted. This overflow factor, in effect, is a measure of the number of nominal allocations remaining in the buffer, or, equivalently, the number of CDFs remaining before the buffer overflows, if the node's buffer is being filled at the nominal rate. As such, a smaller bof(i) indicates a larger likelihood that a buffer overflow will occur.

This buffer overflow factor is further modified to favor those nodes which conform to the premises of ATM. A premise of ATM is that nodes will contain sufficient buffers to accomodate a dynamic allocation of bandwidth. The buffer overflow factor, however, being a measure of how quickly buffer overflow will occur, gives higher priority to nodes with smaller buffers. A second factor, the buffer size factor, bsf(i), is calculated in 434. The buffer size factor is a modified ratio of each node's buffer size in comparison to the average buffer size in the network. If a buffer has a higher than average buffer size, the ratio is fixed to 1, which will result in no modification to the buffer overflow factor. If the node has a below average buffer size, the ratio will be less than one, and this ratio will reduce the priority given to this below average node, as will be shown in 436.

Another premise of ATM is that the node will frequently request less than its nominal allocation, to counterbalance those times when it requests more. A third factor, the behavior factor, beh(i), is calculated in 435. This factor is the percentage of times the node requested less allocation than its nominal. It is a measure of underutilization of a node's allocation. This ratio will affect the priority given to the node, in direct proportion to its degree of underutilization, at 436.

In 436, an overall priority factor, the buffer overflow management factor, BOMF(i), is calculated. As noted above, the priority is inversely proportional to the buffer overflow factor bof(i), and directly affected by the buffer size factor, bsf(i) and the behavior factor, beh(i). The larger the resultant BOMF(i), the higher the priority which should be given to this node. This factor is used in 442 to allocate bandwidth to each node to avoid buffer overflow while giving preference to nodes which conform to the premises of ATM. At 437, the sum of BOMF factors is accumulated. After computing the BOMF for each node having remaining unallocated request, shown by the loop formed by 432–438, the portion of the Overflow Allocation amount, OA, allocated to each of these node is computed in the loop formed by 441–443. Each node is given an allocation in direct proportion to its computed BOMF factor, relative to the total of all the computed BOMF factors, at 442, up to its requested amount. This allocation for each node is returned at 449, and will be added to that node's nominal allocation as previously discussed, and that node's laxity allocation as will be subsequently discussed.

Consistent with this invention, the BOMF factor can be modified in a number of ways. For example, an upper threshold can be defined for all or each of the node's buffer overflow factor. If the node's buffer overflow factor exceeds this threshold, its BOMF could be set to zero, thereby preventing any overflow allocation for nodes which show little risk of overflow. Similarly, BOMF(i) can be constrained to be less than some maximum number, to prevent any one node from monopolizing the allocation as its buffer overflow factor approaches zero.

All remaining unallocated slots are assigned in accordance with a laxity factor priority in 460. As will be subsequently discussed, each node maintains a queue of packets, sorted by their laxity values. Laxity is a measure of the delay which can be acceptably incurred for each packet. A low laxity value indicates that the packet cannot afford to be delayed much longer; a high laxity factor indicates a relative tolerance for delay. Each node communicates the number of packets in their queue within discrete ranges of laxity values. For example, if three ranges are defined as low, medium, and high, a node may inform the base station that it has 15 packets with low laxity, 18 packets with medium laxity, and 6 packets with high laxity. This information is communicated to the base station during the terminal's superslot allocation, as part of the aforementioned uplink control information. As slots are allocated to each node, during the nominal allocation or the buffer overflow allocation discussed above, the number of packets which will be remaining at each node is updated, in laxity priority order. If the node used for the example above is allocated 12 slots during the nominal allocation, and 8 slots in the buffer overflow allocation, for a total of 20 slots. Within this allocation the node will send the 15 low laxity packets, and 5 of the medium laxity packets. The node will be left with no low laxity packets, 13 medium laxity and 6 high laxity packets. Any remaining unallocated slots are allocated, first, to low laxity packets, then to the medium, then to the high. Thus, if another node had any low laxity packets remaining, it would receive the allocation for all of its low laxity packets, up to the number of slots remaining to be allocated. This process is detailed in FIG. 4c. The loop formed by 461–464 allocates slots in priority order, at 463, until there are an insufficient number of slots available to allocate to all of the packets having this laxity level, at 462. If there are insufficient slots for allocation to all the packets of equal laxity level, the allocation at 466 will be distributed according to a round-robin allocation, for ease of computation and queue management, or according to a random allocation, for fairness. The resultant allocations for each node is returned at 469. The total allocation for each node (the sum of nominal+overflow+laxity allocations) will be communicated to the nodes at the beginning of the next CDF period, as previously discussed.

FIG. 5 details the assignment and use of laxity factors at the individual nodes. Each node will place packets received for subsequent transmission into a Laxity Queue. At each node, a laxity factor is assigned when a connection is established. This laxity factor is a relative measure, and is assigned in dependence upon the delay and loss sensitivity associated with the traffic which is to be communicated via this connection. Delay insensitive channels are assigned a finite value as well, to prevent excessive delays. For example, a file transfer communications channel would assign a high laxity factor at each node in the connection. A voice communications channel, on the other hand, would assign a low laxity factor to each node. The exact assignment of values to this factor is not significant; the significant aspect is that the value be consistent and comparable. In the preferred embodiment, the laxity factor is equal to the maximum delay, in time units, allowable at each node along a connection, such that the sum of these numbers would be the maximum end-to-end delay allowable for acceptable communications. At each node, the specified laxity factor is assigned to each packet when it arrives. The insertion of the packet in the laxity queue will be in the order of the packet's assigned laxity factor. If multiple packets have the same laxity factor, they may be placed in further order by their sensitivity to data loss or other factors. For example, data packets would be placed ahead of voice packets with the same laxity factor.

Figure 5A:
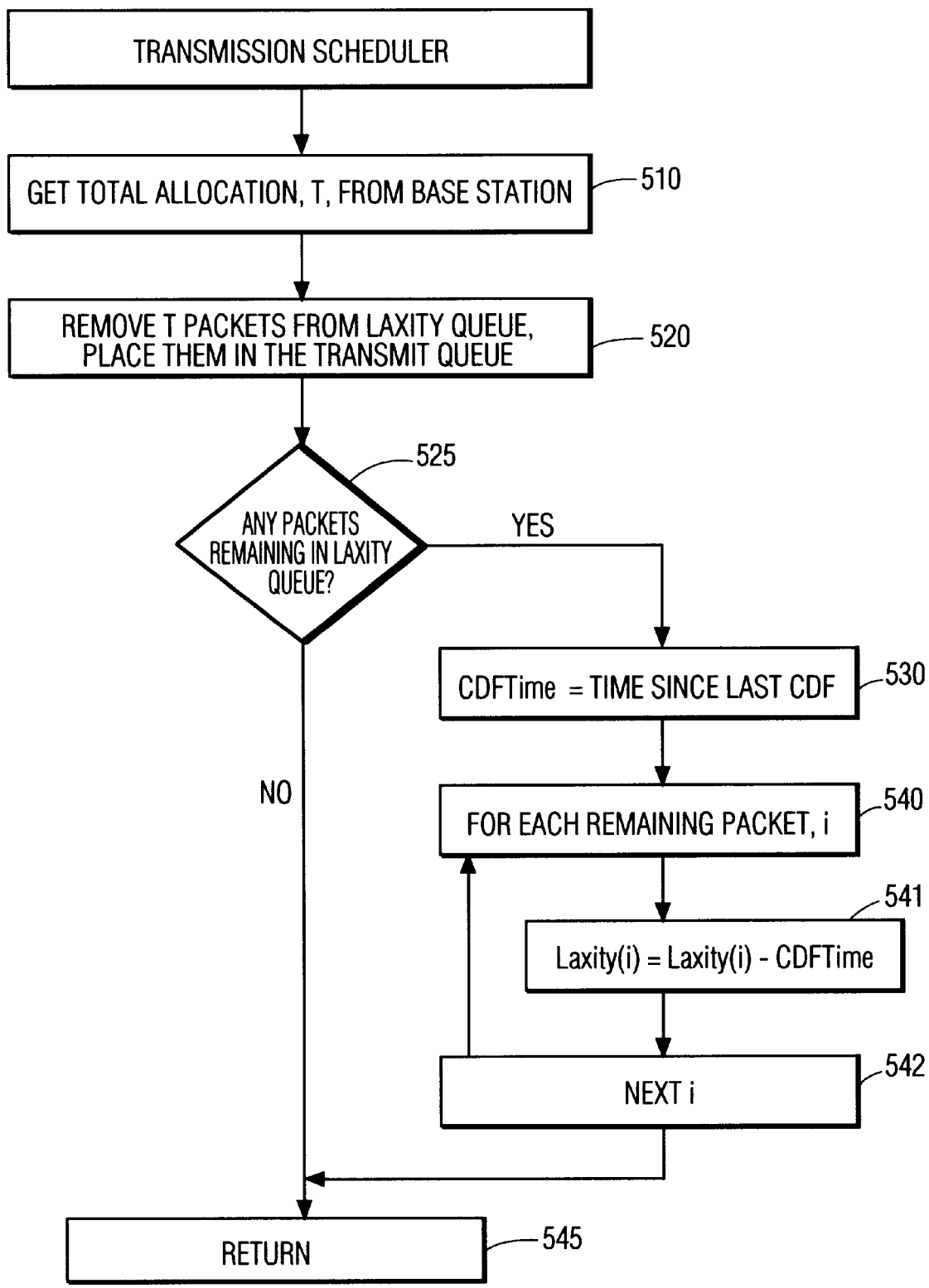
FIGS. 5a–5b show flowcharts for laxity queue processing.

At each CDF period, the node receives its transmission allocation, T, from the base station at 510 in FIG. 5a. T packets are removed from the laxity queue, lowest laxity first, and transferred to the transmit queue for transmission during this CDF period, at 520. If any packets remain, 525, their laxity factors are reduced by the elapsed time since the last CDF. The elapsed time is computed at 530, and the loop formed by 540–542 performs the reduction for each packet in the laxity queue. Thus, the laxity factor for each packet is an indication of the time remaining before subsequent delays become problematic.

Figure 5B:
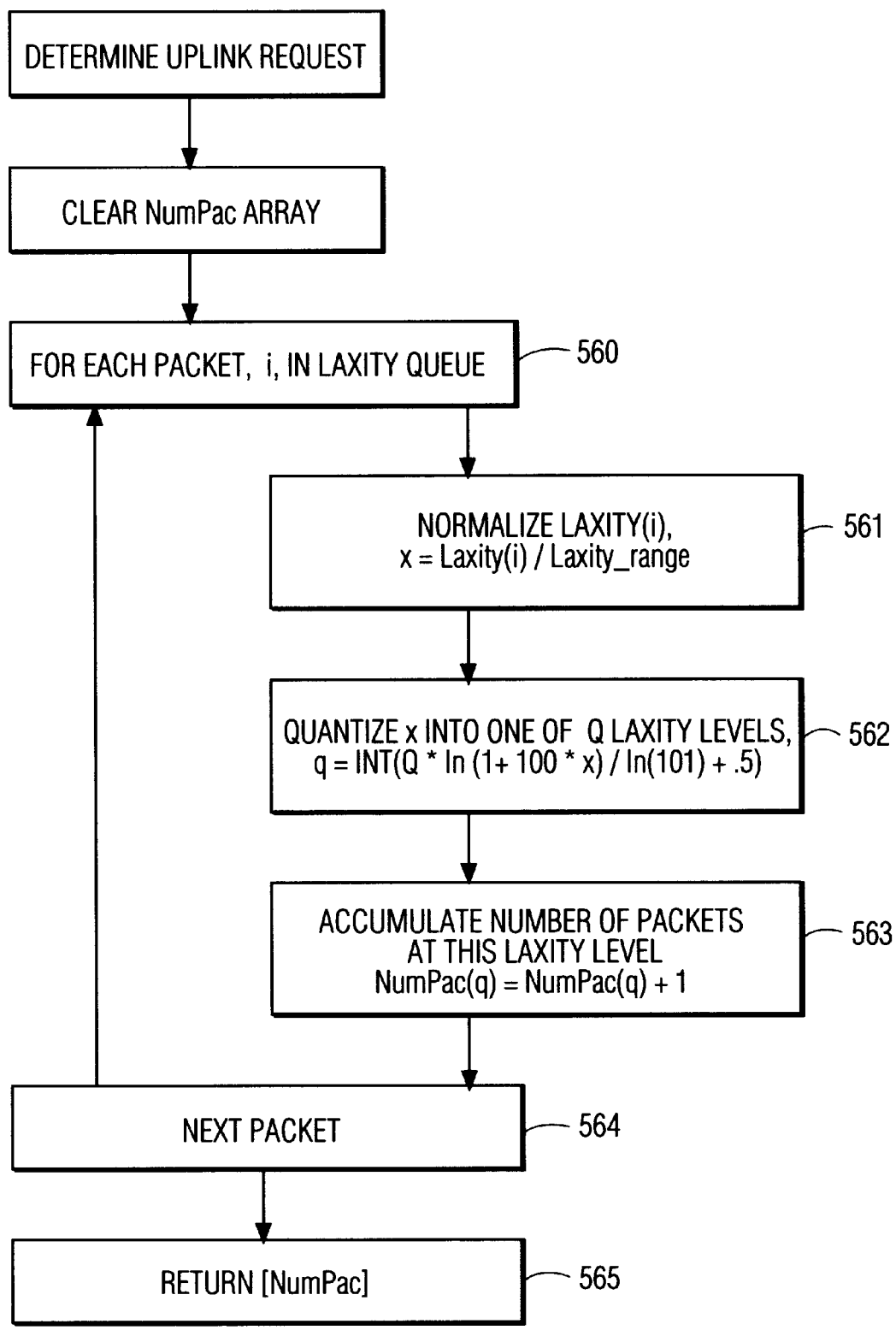

For effective allocation at the base station, the wireless terminals must communicate the number of packets to be transmitted at each laxity level. Thereby, the base station can allocate more slots to nodes having packets with low laxity levels than to nodes having high laxity levels. This information will be transmitted to the base station via the control information which is appended to the first packet from each terminal, as discussed previously. However, the laxity factor can span a large range, and transmitting the number of packets at each of possible values could be a very time and bandwidth consuming process. Therefore, in accordance with this invention, the priority factors are quantized into a much smaller range of values. This quantization can be linear, for example, as by dividing the priority factor range into Q equal parts. The total number of packets contained in each of these Q segments of the priority scale would then be transmitted to the base station. In accordance with this invention, the preferred embodiment comprises a non-linear segmentation of the priority factor range, in accordance with a logarithmic scale. In so doing, packets with low laxity values can be more finely distinguished in the allocation process than those with larger, and less immediately important, values. FIG. 5b shows the quantization in accordance with this invention. NumPac is an array of values. NumPac(q) contains a count of the number of packets at each one of Q possible laxity levels. Boxes 560 through 564 represent a loop which is executed for each packet in the laxity queue. The quantized laxity level for each packet is determined by the calculations at 561 and 562, and the NumPac associated with this quantization level accumulates the number of packets with this resultant quantization level at 563. After this computation for all the packets in the laxity queue, the resultant accumulations in the NumPac array are returned, at 565, for subsequent communication to the base station via the control information in the terminal's superslot assignment, as discussed previously. The base station performs a similar laxity level accumulation for its downlink packets, and the laxity allocation is performed, as noted above, without regard to whether the traffic is uplink or downlink related.

To further optimize the efficiency of a wireless network in accordance with this invention, a beacon based synchronization and management capability is provided, as shown in FIG. 6. Periodically, at intervals much longer than the nominal CDF period, time is allocated for a beacon communications period, 610. The purpose of this signalling period is to separate long term management functions from the above described short term functions such as CDF slot allocation and signalling. The beacon signal will contain, for example, a master synchronizing signal. All terminals on the network will use this synchronizing signal to coarsely adjust their local timing signals, perform filter equalizations, and other adjustment or maintenance tasks. Thereafter, at each CDF, the synchronization signalling need only contain the signalling required to perform finer adjustments. Dynamic filter parameters gathered during the beaconing period can, for example, be utilized directly to initialize such filters directly before the receipt of the CDF signal which provides for a finer adjustment.

The beacon period is also the period wherein the aforementioned connection establishment and QoS negotiations take place, as well as connection disestablishment and other relatively long term or infrequent events. Placing these activities within this slower frequency timing minimizes the impact of such activities on the QoS of established connections. Connection establishment may, for example, require the communication of a thousand packets. If we force these communications to occur by the transfer of twenty packets at each beacon, and the beacons only occur at every tenth of a second, it will take five seconds to establish the connection. The impact on the network, however, utilizing this approach, will be significantly less than if the request for a thousand slots competed with the established connections at one CDF period, and the connection was made in less than a second by allocations taken away from the established connections. Limiting the effective bandwidth for connection establishment lengthens the time required to establish each connection, but results in greater performance once the connection is established.

Additionally, maintaining a separate scheme for connecting and disconnecting terminals also provides for efficiencies in the previously described CDF structure and operation, particularly with regard to the Alert period 340. Absent this beacon signalling, the CDF structure and protocol must accommodate alert signalling from any potential wireless terminal. Such a broad task may be infeasible to accommodate in the polling scenarios discussed previously. By segregating the connection establishment from the routine CDF management, the list of inactive terminals used for polling can be minimized to be only those currently connected terminals which are also currently inactive.

The periodic beacon signalling also allows for more efficient power conservation. A currently unconnected wireless telephone, for example, could monitor a beacon period, knowing that connections are only established during such periods. If it was not addressed in the beacon, it could set its clock to interrupt itself just before the next scheduled beacon period, and enter an inactive state in the interim.

To achieve the advantages stated, it is preferred that the beacon period occur at very regular intervals. As such, in light of the fact that CDFs are of variable length, there may be gaps in the series of CDFS, as shown at 620. Because the base station allocates the specific time of transmission from each node, a CDF can be easily partitioned to avoid excessively long gaps, as shown at 631–633. Without partitioning, the gap 632 would extend from the beginning of CDF period 631 to the beginning of beacon period 611. Provided that such a gap is sufficiently long for the base station to transmit its control signalling information (310 in FIG. 3), the base station can schedule the time of allocated transmissions to avoid the beacon period. A portion of the CDF will be transmitted at 631, a smaller gap 632 will be realized, and the remainder of the CDF will be scheduled by the base to occur at 633. Alternatively, some variance may be permitted in the regularity of the beacon, and it could occur immediately following a CDF, or portion of CDF, thereby eliminating all unused gaps in time.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method for communicating data packets within a network comprising a plurality of nodes, wherein an active node is one of said nodes having one or more packets to transmit, said method comprising the steps of:

communicating a request for an allocation of time within a frame period from each active node, allocating a first time of transmission and a first duration of transmission for transmitting messages to said active nodes;

allocating a second time of transmission and a second duration of transmission within said frame period from each of said active nodes, in dependence upon said request for allocation, communicating said allocation of second time and second duration to each of said active nodes within said frame period, and transmitting packets from each of said active nodes in accordance with said allocation of second time and second duration within said frame period, wherein said allocating step includes:

determining a delay tolerance level associated with each of said packets, and allocating said second time of transmission and said second duration of transmission to each of said active nodes, in dependence upon said request for allocation, and in dependence upon said tolerance levels.

2. A method for communicating data packets as in claim 1, wherein some or all of said communicating and transmitting is via a wireless communications medium.

3. A method as in claim 1, wherein said allocation of the second time and second duration of transmission from each active node is determined based upon one or more allocation parameters associated with each of said active nodes.

4. A method as in claim 3, wherein associated with each of said active nodes is a minimal allocation for a particular communication, and wherein one of said allocation parameters is the minimal allocation associated with each of said active nodes.

5. A method as in claim 3, wherein each of said active nodes comprise a buffer for transmitting or receiving said packets, and one of said allocation parameters is the capacity of said buffer at each of said active nodes.

6. A method as in claim 3, wherein said packets are ATM packets, and one or more of said allocation parameters comprise one or more ATM Quality of Service parameters.

7. A method as in claim 1, wherein:

said communicating of the request for allocation from each node comprises the steps of:

appending said request to the first packet transmitted during the time allocated to the node in the current frame period, or, if time was not allocated to the node in the current frame period, communicating an alert message after the last time allocated among all the nodes in the current frame period.

8. A method for communicating data packets within a network comprising a plurality of nodes, wherein an active node is one of said nodes having one or more packets to transmit, said method comprising the steps of:

communicating a request for an allocation of time within a frame period from each active node, allocating a first time of transmission and a first duration of transmission for transmitting messages to said active nodes;

allocating a second time of transmission and a second duration of transmission within said frame period from each of said active nodes, in dependence upon said request for allocation;

communicating said allocation of second time and second duration to each of said active nodes within said frame period, transmitting packets from each of said active nodes in accordance with said allocation of second time and second duration within said frame period;

wherein associated with each packet is a delay tolerance level, and, said request for allocation from each active node comprises a count of the number of packets to be transmitted at each delay tolerance level.

9. A communications device for communicating messages within a network comprising a plurality of nodes, said device comprising:

means for associating a delay tolerance level with each of said messages, means for transmitting a request for an allocation of time for transmitting messages, means for receiving an allocated first time and first duration for receiving messages from other nodes, means for receiving an allocated second time and second duration for transmitting messages to other nodes, means for receiving messages at said first time for said first duration, means for transmitting messages at said second time for said second duration in accordance with said delay tolerance levels.

10. A device as in claim 9, wherein said communications are via a wireless medium.

11. A communications device for communicating messages within a network comprising a plurality of nodes, said device comprising:

means for associating a delay tolerance level with each of said messages, means for receiving a request for an allocation of time for transmitting messages to the device from one or more nodes, means for allocating a first set of times and durations for transmitting messages from the device, wherein a time and duration of transmission is associated with each of the nodes for which the device has one or more messages to send, means for allocating a second set of times and durations for receiving messages at the device, wherein a time and duration of reception is associated with each of the nodes which request said allocation of time for transmitting messages to said device, means for transmitting messages at each of said times for said durations in said first, and means for receiving messages at each of said times for said duration in said second set, wherein said allocation of said first and second sets of times and durations is dependent on said delay tolerance levels.

12. A device as in claim 11, wherein each of said nodes have a buffer having a capacity, and said allocation of said second set of times and durations is dependent upon said capacity of said buffers at each of said nodes.

13. A device as in claim 11, wherein each of said nodes have a node buffer having a capacity, and wherein the device further comprises a local buffer having a capacity, and said allocation of said first and second sets of times and durations is dependent upon the capacity of said node buffers and the capacity of said local buffer.

14. A device as in claim 11, wherein a minimal allocation for a particular communication is associated with each of said nodes, and said allocation of said second set of times and durations is dependent upon said minimal allocations.

15. A device as in claim 11, wherein a minimal node allocation for a particular communication is associated with each of said nodes, and a minimal local allocation for a particular communication is associated with the device, and said allocation of said first and second sets of times and durations is dependent upon said minimal node allocations and said minimal local allocation.

16. A device as in claim 11, wherein:

a minimal node allocation for a particular communication is associated with each of said nodes, a minimal local allocation for a particular communication is associated with the device, and said allocation of said first and second sets of times and durations is dependent upon said minimal node allocations, said minimal local allocation, and said delay tolerance levels.

* * * * *